United States Patent [19]

Barrington

[11] Patent Number: 4,801,160
[45] Date of Patent: Jan. 31, 1989

[54] HIGH-PRESSURE FLUID FLOW CONNECTOR

[75] Inventor: Burchus Q. Barrington, Duncan, Okla.

[73] Assignee: Michael J. Caddell, Richardson, Tex. ; a part interest

[21] Appl. No.: 302,973

[22] Filed: Sep. 17, 1981

[51] Int. Cl.[4] .............................................. F16L 19/00
[52] U.S. Cl. ..................................... 285/81; 285/110; 285/332.3; 285/354
[58] Field of Search ...................... 285/332.3, 354, 81, 285/82, 332.2, 333, 334, 110

[56] References Cited

U.S. PATENT DOCUMENTS

| | | | |
|---|---|---|---|
| 904,673 | 11/1908 | Bideker | 285/354 X |
| 1,542,467 | 6/1925 | Moratta | 285/81 X |
| 1,691,851 | 11/1928 | McCuean | 285/81 |
| 2,239,942 | 4/1941 | Stone et al. | 285/334 X |
| 2,907,589 | 10/1959 | Knox | 285/332.2 X |
| 3,249,372 | 5/1966 | Pollack | 285/332.3 |
| 3,615,109 | 10/1971 | Brinda et al. | 285/354 X |
| 3,635,499 | 1/1972 | Reddy | 285/332.3 |
| 4,209,193 | 5/1977 | Ahlstone | 285/332.3 X |

FOREIGN PATENT DOCUMENTS

| | | | |
|---|---|---|---|
| 2438387 | 2/1976 | Fed. Rep. of Germany | 285/333 |
| 491804 | 2/1975 | U.S.S.R. | 285/332.3 |

Primary Examiner—Thomas F. Callaghan
Attorney, Agent, or Firm—Michael J. Caddell

[57] ABSTRACT

A quick-connection type connector is disclosed for the coupling of high-pressure fluid flow lines, which connector utilizes an externally threaded female portion and a tapered male portion with a rotatable collar mounted thereon. Elastomeric seal means are provided as well as a metal-to-metal seal to protect the elastomeric seal means, and a locking assembly to prevent backing off of the threaded portion.

6 Claims, 2 Drawing Sheets

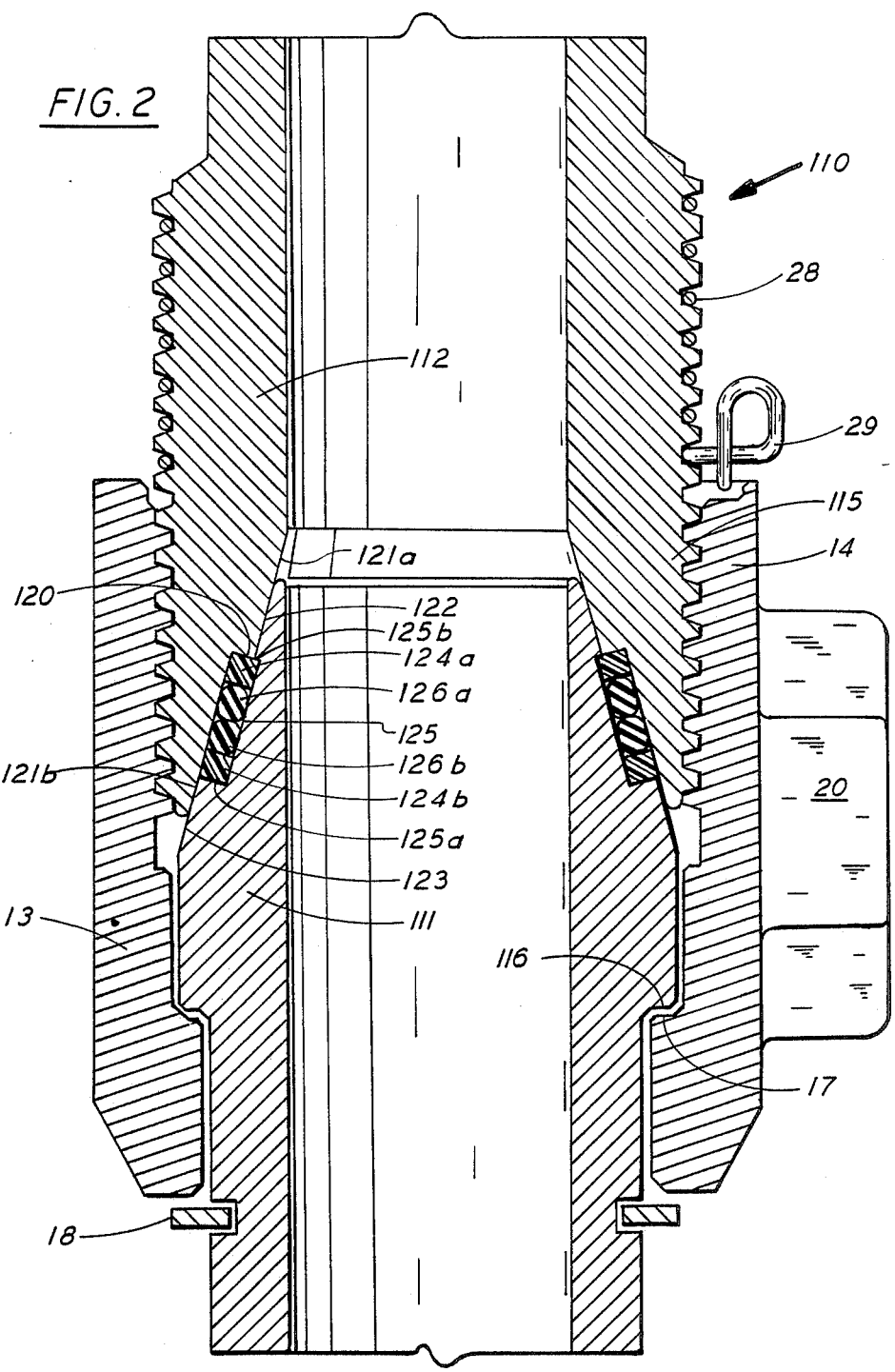

HIGH-PRESSURE FLUID FLOW CONNECTOR

BACKGROUND OF THE INVENTION

The present invention generally involves connectors for piping and more particularly discloses what is generally termed a "quick connector" or union. This invention, in one particular embodiment, is useful in the drilling, production, and workover of oil and gas wells.

In large industrial operations and more particularly in the oil and gas industry it is often desirable and many times imperative that extremely high pressure fluids be pumped continuously from large powerful pumping systems into hydraulicly driven machinery or, as in the case of oil well servicing, directly into the borehole penetrating the underground formation. The fluids pumped encompass a broad range of liquids, some caustic and corrosive, some abrasive, and some very viscuous.

Oftentimes it is imperative to be able to place a movable pumping system, such as a truck or skid mounted hydraulic intensifier, at an oil well site and quickly supply high pressure fluid to the wellbore to acidize, fracture, or kill and prevent a blowout of the oilwell. The pumping system is usually connected to the wellbore by piping commonly called steel hose, and the connections between the sections of hose, the truck, and the wellhead must be capable of quick connections, good sealing ability, and high pressure capability under abrasive and corrosive conditions.

Conventional connectors for steel hose generally comprise a male connector end and a female connector end. The male end or the female end normally carries a primary seal consisting of a resilient seal such as an elastomeric radial seal or an O-ring seal. A secondary metal-to-metal seal may be attempted to back up the primary seal. One example of such a connector is disclosed in the '78–79 World Oil Catalog at page 2513 and is designated the Weco$^R$ Misaligning Union.

This conventional union has as its primary seal an elastomeric O-ring located in the male portion of the connector. Both the male and female connectors have arcuate seating shoulders to allow misalignment of the two pieces of up to 15°.

One of the major defects of the conventional connector assemblies is the use of an elastomeric seal as the primary seal. This exposes the seal to the high-pressure corrosive and abrasive environment passing through the piping. It also tends to extrude the seal into the flowstream which eventually results in the seal member blowing inward into the flowstream and lodging in a sensitive flow meter or other analytical instrument downstream from the connector. This is a particularly bad problem when the connectors are used in the production piping leading away from a high pressure oil or gas well.

Another serious defect of the conventional connectors is their tendency to vibrate loose or "back off" when in service. Because of the nature of these connectors and their use of an elastomeric primary seal, only a small amount of unthreading of the connector union allows loosening of the male and female ends to where the seal is quickly and easily pulled into the flowstream causing not only a loss of pressure at the connection, but also the accompanying damage to downstream instruments and tools. Because the conventional unions make-up and seal only at the very end of their confinement, a loosening of as little as one-fourth turn on the union by backing off of the thread can cause seal loss.

Backing off of the threaded portion of a connector can be a common occurrence due to several factors. One factor is the constant physical vibration from the pump motors to which the connection is attached. A second factor contributing to back-off is the constant high-pressure pump surges which cause the hydraulics to act internally and externally to loosen the connectors.

The present invention overcomes these deficiencies of the prior art by providing a quick connector which utilizes an interference-fit primary metal-to-metal seal backed up by a secondary elastomeric seal and having a locking means to prevent backing off of the threaded portions.

BRIEF DESCRIPTION OF THE DRAWINGS

FIG. 2 illustrates a second embodiment of the invention.

DESCRIPTION OF THE PREFERRED EMBODIMENTS

Figure 1:
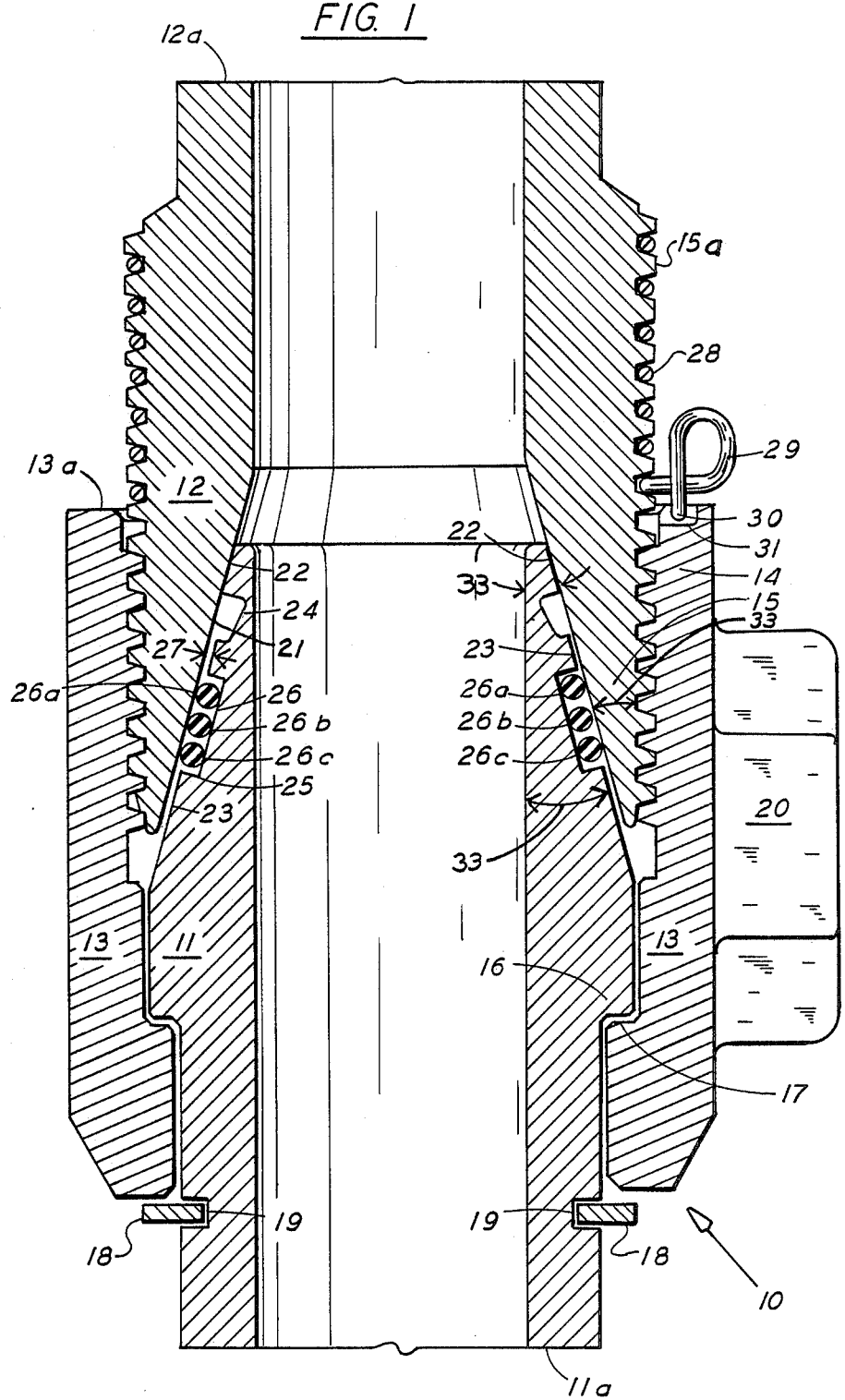
FIG. 1 consists of a cross sectional side view of one preferred embodiment of the invention.

Refering to the drawing, in which a cross sectional side view of the preferred embodiment of the invention is illustrated, a connector assembly 10 is shown having a male connector 11 and a female connector 12 both of which are generally cylindrical in configuration and have conically tapered surfaces formed thereon and therein, respectively. A union or collar 13 is rotatably held on the outside of the male connector 11 and has an internally threaded cylindrical end section 14 arranged for threaded engagement with a complementary externally threaded section 15 on female portion 12. The threads of sections 14 and 15 may be of the conventional cylindrical Acme or buttress threads or of any other known thread design such as tapered or stepped threads.

Male connector 11 has an external annular shoulder 16 formed thereon and projecting outwardly therefrom arranged for abutment with a matching inner annular shoulder 17 formed in union 13. This abutment shoulder arrangement 16 and 17 provides the means for drawing male connector 11 into sealing engagement with female connector 12 by threading section 14 onto section 15 of the female connector 12. A retainer ring 18 is snapped into an annular groove 19 formed in male connector 11 to retain the end of union 13 between ring 18 and shoulder 16 which also protects the conical tapered sealing surface on the male connector 13 when the quick connector is disassembled. One or more lugs 20 are attached to or integrally formed on union 13 to allow impact tightening of the union on connector 12.

The extremely efficient sealing of male connector 11 in female connector 12 derives from the internally tapered conical surface 21 formed in connector 12 and the compound tapered conical surfaces 22 and 23 formed externally on connector 11. The angle of taper on all three conical surfaces in this embodiment was selected at 17.5° as indicated on the drawing at 33. This particular angle is preferable with this embodiment because it allows the use of multiple O-ring seals placed side-by-side, which seals are of standard diameters, in one-eighth inch increments of diameter.

The configuration of the compound conical taper on male connector 11 is particularly important to the operation of the invention. The compound taper comprises an interference fit conical section 22 at the extreme end portion of the male connector and separated from the undersize conical section 23 by an undercut annular channel 24. A second channel 25 is also formed on male connector 11 directly behind channel 24 to receive one or more elastomeric O-ring seals 26. The amount of interference of surface 22 in section 15 can be seen in the drawing at 27. This appears as a gap or undersize in the drawing because the connection has not been fully tightened or "drawn up". When the connection is fully drawn up, surfaces 22 and 23 will both be in substantially full contact with the internal taper of section 15.

The provisions of undercut 24 in the tapered portion of section 11 creates a "flex-ring" out of the interference end portion 22 of the male connector. As the connection is drawn up tight by the threading of union 13 on threaded section 15, the interference of end 22 will cause it to flex radially inward and establish the primary metal-to-metal seal as a result of the interference fit. The interference fit does not cause a radially outward flexing of connector portion 15 because of the relative thickness of this section (which gives it a good hoop strength) as well as the reinforcing effect of the outermost section 14 which is located around section 15 and which adds to its overall hoop strength.

The selection of the amount of interference fit 27 between surface portion 22 and section 15 depends upon the size of the connector and the choice of O-rings used. In one particular embodiment, a connector with a two inch internal bore diameter would utilize an interference fit 27 of around 0.008 to 0.010 inches, with O-ring seals of about three-sixteenths (3/16) inch cross-sectional diameter. This provides an effective primary seal and also compresses the multiple O-rings to the optimum compression in groove 25 just as surface 23 contacts the tapered surface 21 of connector portion 15. In the embodiment shown, three elastomeric O-ring seals 26 are illustrated which gives an optimum secondary seal. The inner and outer O-rings 26a and 26c, respectively, provide additional shielding and protection of the middle O-ring 26b. In addition to the three secondary O-rings, an additional O-ring or other-shaped elastomeric annular seal could be placed in channel 24 to provide even additional sealing without requiring further groove machining.

In order to prevent backing-off of the connection once it has been made-up to the proper torque, a unique locking system is utilized between the union 13 and the threaded end of connector 12. This comprises a helical spring 28 having an end loop 29 and an engagement tang 30 at the end of loop 29 protruding axially, parallel with the spring axis. The helical spring is sized in both spring diameter and wire diameter such that it will fit snugly in the helical groove formed by the external thread 15a on threaded section 15. One or more recesses 31 are formed in the axial end wall 13a of union 13 to receive in relatively close-fitting relationship the tang 30 of spring 28.

Spring 28 is located on threaded section 15 with tang 30 engaged in one of the recesses 31 so that as long as the union 13 is turned in a "right hand" or tightening rotation, the spring is expanded radially outward and fits loosely in threads 15a. As soon as the union 13 attempts to move in a loosening or left hand rotation, the spring will be tightened radially, seating firmly in the grooves of thread 15a, and effectively locking collar 13 on connector 12. When it is desirable to remove collar 13, the loop 29 is gripped and pulled to the left to release tang 30 from recess 31, which releases union 13 to be unthreaded from connector 12.

Thus in typical operation, the connector assembly 10, comprising the above described preferred embodiment, is attached to two sections of pipe or steel hose to be connected together. The male portion 11, containing the union 13 rotatably held thereon, is attached at end 11a by means such as welding or attachment by conventional pipe threads to one length of steel hose. The female portion 12 is then attached at end 12a by welding or threads to a second length of steel hose to be connected to the first length. The male and female sections are then joined and union 13 is threaded onto section 15 of connector 12 until tapered surface 22 seats on surface 21. Further tightening can then be achieved by impacting lug 20 thereby further drawing up the connectors until surface 23 seats on surface 21. At this time flex-ring 22 has been flexed radially inward and has formed a positive primary metal-to-metal seal between connectors 11 and 12. Also the measured amount of compression 27 is just sufficient to compress seal rings 26 an optimum amount to effect the secondary seal therein.

When surface 23 reaches abutment with surface 21 the operator will be signalled by a sudden feeling of solid resistance in the union to further tightening thereof and will be informed of the abutment of these surfaces. The engagement of spring tang 30 in recess 31 will occur automatically as union 13 progresses down threads 15a. Spring 28 may be placed on threads 15a prior to engagement of connector 11 in female connector 12. Engagement of tang 30 in recess 31 prevents back-off of union 13 from connector 12 and maintains the primary seal at 22 arising from the interference fit thereof. As previously mentioned, when it is desirable to disconnect the connectors, the springlock can be released by pulling back on spring loop 29 to withdraw tang 30 from recess 31 until union 13 can be released by impact on the opposite side of lug 20 from that used in tightening.

Referring now to FIG. 2 in which a second embodiment of the invention is disclosed in a cross-sectional side view, a connector assembly 110 comprises a male connector 111 and a female connector 112 both of which are generally cylindrical and similar in configuration to those of the first embodiment. A union or collar 13 having hammer lugs 20, threaded end section 14, and annular abutment shoulder 17 thereon is rotatably mounted on male connector 111 and retained by shoulder 116 and retainer ring 18. The coaction of shoulder 17 against shoulder 116 provides the closing force for seating male connector 111 in female connector 112.

In this embodiment both the male connector and the female connector are provided with stepped seating surfaces each of which is a compound tapered conical surface. The male connector surface comprises a first conical surface 122, an inwardly stepped second conical surface 125 separated from surface 122 by shoulder 125b, and a third conical surface 123 separated from surface 125 by shoulder 125a. Shoulders 125a and 125b coact with surface 125 to form a seal receptacle channel.

Female connector 112 has a compound conical sealing surface 121 comprising upper conical surface 121a and lower conical surface 121b, separated by shoulder 120. Shoulder 120 is arranged to align with shoulder 125b to form the upper end of seal channel 125 when the male connector is fully seated in the female connector. The height of shoulder 125b can preferably be made to equal the amount of interference fit between surface 122 and 121a which in one embodiment was around 0.008 to 0.010 inches, or can be set at a higher or lower amount.

A pair of backup rings 124a and 124b are located in the ends of channel 125 and are preferably made of a relatively rigid material such as glass-reinforced Teflon. One or more elastomeric seal members 126a and 126b, such as "O" rings or "radial" seals, are trapped between the backup rings.

Preferably the backup rings and seal rings are selected such that their combined longitudinal length exceeds the length of channel 125 and their radial thickness exceeds the depth of channel 125. Thus when the connector is made up tight, the seal rings will be placed in longitudinal as well as radial compression to provide even better sealing. The interference fit between surfaces 122 and 121a still provides the primary metal-to-metal seal. This compound compression of the seal rings 126a and 126b is particularly advantageous in sealing against very high pressure gas and/or liquid. Other than the seal arrangement of this embodiment, its method of assembly and operation is similar to that previously described for the first embodiment.

Thus the present invention discloses a quick connector which exhibits a metal-to-metal primary seal, an elastomeric secondary seal which is protected by the metal-to-metal seal, and locking means which effectively prevents backing-off at the threaded union but allows quick and easy disengagement when desirable. The primary seal comprises an interference fit flexring on a conical tapered sealing surface on the male connector which is maintained flexed inward in constant seating engagement by the combined hoop strength of the thicker sections encircling it. The resulting connector is extremely resistant to seal blowout, elastomer degradation, and backing-off of the threaded sections.

Although specific preferred embodiments of the present invention have been herein described in the detailed description above, the description is not intended to limit the invention to the particular forms or embodiments disclosed therein since they are to be recognized as illustrative rather than restrictive, and it will be obvious to those skilled in the art that the invention is not so limited. Thus, the invention is declared to cover all changes and modifications of the specific examples of the invention herein disclosed for purposes of illustration which do not constitute departure from the spirit and scope of the invention.

The embodiments of the invention in which an exclusive property or privilege is claimed are defined as follows:

1. A tubular connector assembly to connect two tubular members together in fluid tight sealing arrangement, said connector assembly comprising:
    a male connector body adapted for connection to a tubular member, said body having an internal bore therethrough;
    a first conical sealing surface forming a portion of the exposed external end of said body;
    a second conical sealing surface on said external end of said body, parallel to and non-aligned with said first conical sealing surface;
    a flex channel between said first and second surfaces;
    a seal channel in said second surface containing circumferential elastomeric seal means;
    a female connector body adapted for connection to a tubular member at one end and having an internal conical sealing surface at the other end adapted for surface contact with said first and second sealing surfaces on said male connector body;
    wherein said first sealing surface is further arranged to provide a positive interference fit with said female sealing surface when said second sealing surface is in sealing engagement with said female sealing surface; and,
    tightening means for drawing said male connector body into sealing engagement in said female connector body, wherein said tightening means comprises collar means rotatably held on one of said connector bodies and having thread means, and, thread means on the other connector body adapted for engagement with said collar thread means.

2. The connector assembly of claim 1 further comprising locking means arranged to lock said collar means on said body means, said locking means comprising helical spring means adapted for preselectable engagement with said collar means and coactive engagement with said body thread means.

3. A connector assembly for the fluid-tight connection of two tubular sections, said assembly comprising:
    a male connector adapted for permanent attachment to a tubular section;
    a female connector adapted for permanent attachment to a tubular section;
    means for drawing said male connector into said female connector in snug-fitting engagement therein;
    primary seal means between said male connector and said female connector and comprising an interference fit metal-to-metal seal; and;
    secondary seal means between said male connector and said female connector, located radially outwardly therefrom, and comprising at least one circumferential elastomeric seal;
    wherein said male connector and said female connector are adapted for locking engagement against any further relative movement therebetween; and,
    wherein said male and female connectors are adapted to provide radial compression of said at least one elastomeric seal when said male connector is fully drawn into said female connector; and,
    wherein said drawing means comprises an internally threaded collar rotatably held on one of said connectors, and external threads on said other connector arranged for engagement in said internal threads of said collar.

4. The connector assembly of claim 3 wherein said male and female connectors are adapted to provide radial and longitudinal compression of said elastomeric seal when said male connector is fully drawn into said female connector.

5. The connector assembly of claim 3 wherein said connector assembly further comprises spring locking means engaging in said external threads and arranged for preselected engagement with said collar.

6. A connector assembly for connecting two tubular sections together in fluid-tight sealing arrangement, said assembly comprising:
    a male connector adapted for attachment at one end to a tubular section and having a compound conical tapered sealing surface formed on the external portion of the other end;

a female connector adapted at one end for attachment to a tubular section and having a compound conical tapered sealing surface in the internal portion of the other end;

said male sealing surface adapted for sealing engagement with said female sealing surface, said surfaces further arranged to form a metal-to-metal, interference fit, primary seal therebetween, and also further arranged to form a circumferential elastomeric seal channel therebetween;

elastomeric seal means in said seal channel arranged for secondary sealing contact with said sealing surfaces;

a threaded collar rotatably located on one of said connectors and arranged to threadedly engage complementing threads on said other connectors; and, spring locking means on said complementing threads arranged to preselectively engage said collar in locking engagement on said connectors;

wherein said sealing surfaces are further arranged to provide radial and longitudinal compression of said seal means.

* * * * *